United States Patent
Pogde et al.

(10) Patent No.: US 11,237,923 B2
(45) Date of Patent: **\*Feb. 1, 2022**

(54) PACKET-BASED DIFFERENTIAL BACKUP OF NETWORK-ATTACHED STORAGE DEVICE CONTENT

(71) Applicant: Cohesity, Inc., San Jose, CA (US)

(72) Inventors: Prashant Pogde, Sunnyvale, CA (US); Sunil Moolchandani, Santa Clara, CA (US); Mohit Aron, Saratoga, CA (US); Markose Thomas, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,548

(22) Filed: Jul. 22, 2020

(65) Prior Publication Data

US 2021/0004301 A1 Jan. 7, 2021

Related U.S. Application Data

(63) Continuation of application No. 16/246,367, filed on Jan. 11, 2019, now Pat. No. 10,769,033.

(51) Int. Cl.
*G06F 11/14* (2006.01)
*H04L 29/06* (2006.01)

(52) U.S. Cl.
CPC ...... *G06F 11/1469* (2013.01); *G06F 11/1451* (2013.01); *G06F 11/1464* (2013.01); *H04L 69/22* (2013.01); *G06F 2201/84* (2013.01); *G06F 2201/855* (2013.01)

(58) Field of Classification Search
CPC ............. G06F 11/1469; G06F 11/1451; G06F 11/1464; G06F 11/1458; G06F 11/1453; G06F 11/1461; G06F 11/1466; G06F 3/065; G06F 3/067; G06F 3/0641; G06F 2201/84; G06F 2201/855; H04L 69/22
USPC .......... 711/162; 707/999.204, 640, 649, 646, 707/647, 648
See application file for complete search history.

(56) References Cited

U.S. PATENT DOCUMENTS

| | | | |
|---|---|---|---|
| 6,526,418 | B1 | 2/2003 | Midgley |
| 8,412,688 | B1 | 4/2013 | Armangau |
| 9,690,666 | B1 | 6/2017 | Shembavnekar |
| 9,996,539 | B1 | 6/2018 | Natanzon |
| 10,083,094 | B1 | 9/2018 | Thomas |
| 2007/0050573 | A1 | 3/2007 | Arakawa |
| 2010/0088280 | A1 | 4/2010 | Satoyama |
| 2014/0040199 | A1 | 2/2014 | Wojclech |
| 2015/0370502 | A1 | 12/2015 | Aron |
| 2016/0034356 | A1 | 2/2016 | Aron |

(Continued)

*Primary Examiner* — William E. Baughman
(74) *Attorney, Agent, or Firm* — Van Pelt, Yi & James LLP

(57) ABSTRACT

A method and system for performing incremental backup of a network attached storage (NAS) device are described. A storage capture instance associated with a first time instance is received from a network attached storage device. At least a portion of metadata of tracked network packets associated with the network attached storage device is also received. At least one changed content item of the network attached storage device that has changed since the first time instance is identified by analyzing the at least the portion of the metadata of the tracked network packets received. An incremental backup of the network attached storage device is performed at a second time instance based at least in part on the at least one changed content item identified.

20 Claims, 12 Drawing Sheets

(56) References Cited

U.S. PATENT DOCUMENTS

2016/0283329 A1 9/2016 Natanzon
2017/0032013 A1 2/2017 Zheng
2018/0217756 A1 8/2018 Liu

PACKET-BASED DIFFERENTIAL BACKUP OF NETWORK-ATTACHED STORAGE DEVICE CONTENT

CROSS REFERENCE TO OTHER APPLICATIONS

This application is a continuation of co-pending U.S. patent application Ser. No. 16/246,367, entitled PACKET-BASED DIFFERENTIAL BACKUP OF NETWORK-ATTACHED STORAGE DEVICE CONTENT filed Jan. 11, 2019 which is incorporated herein by reference for all purposes.

BACKGROUND OF THE INVENTION

Often, file system data is desired to be replicated. For example, a primary storage system may store data for enterprise applications. A network-attached storage (NAS) device may be used to provide additional storage for the primary storage system. Data on the primary storage system, as well as on any NAS devices used, may be replicated on a secondary storage system. The secondary storage may be used to provide backup, protection or other services for the primary storage system. Such a secondary storage system may store large amounts of data (e.g., terabytes, petabytes, etc.).

Although use of a secondary storage system allows data for the NAS devices in the primary storage system to be preserved, replicating the data can be time-consuming. In order to preserve recent states of the primary storage system, backup of data is typically performed periodically. This results in additional consumption of computing resources. Accordingly, what would be useful is a mechanism for improving backup of primary storage systems, particularly the NAS devices used therein.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for performing incremental backup of a network attached storage (NAS) device are described. A storage capture instance associated with a first time instance is received from a NAS device. At least a portion of metadata of tracked network packets associated with the NAS device is also received. A tracked network packet is a network packet that includes one or more change operations for content item(s) on the NAS device. Changed content item(s) of the NAS device, which have changed since the first time instance, are identified by analyzing the at least the portion of the metadata of the tracked network packets received. An incremental backup of the network attached storage device is performed at a second time instance based at least in part on the at least one changed content item identified.

Figure 1:
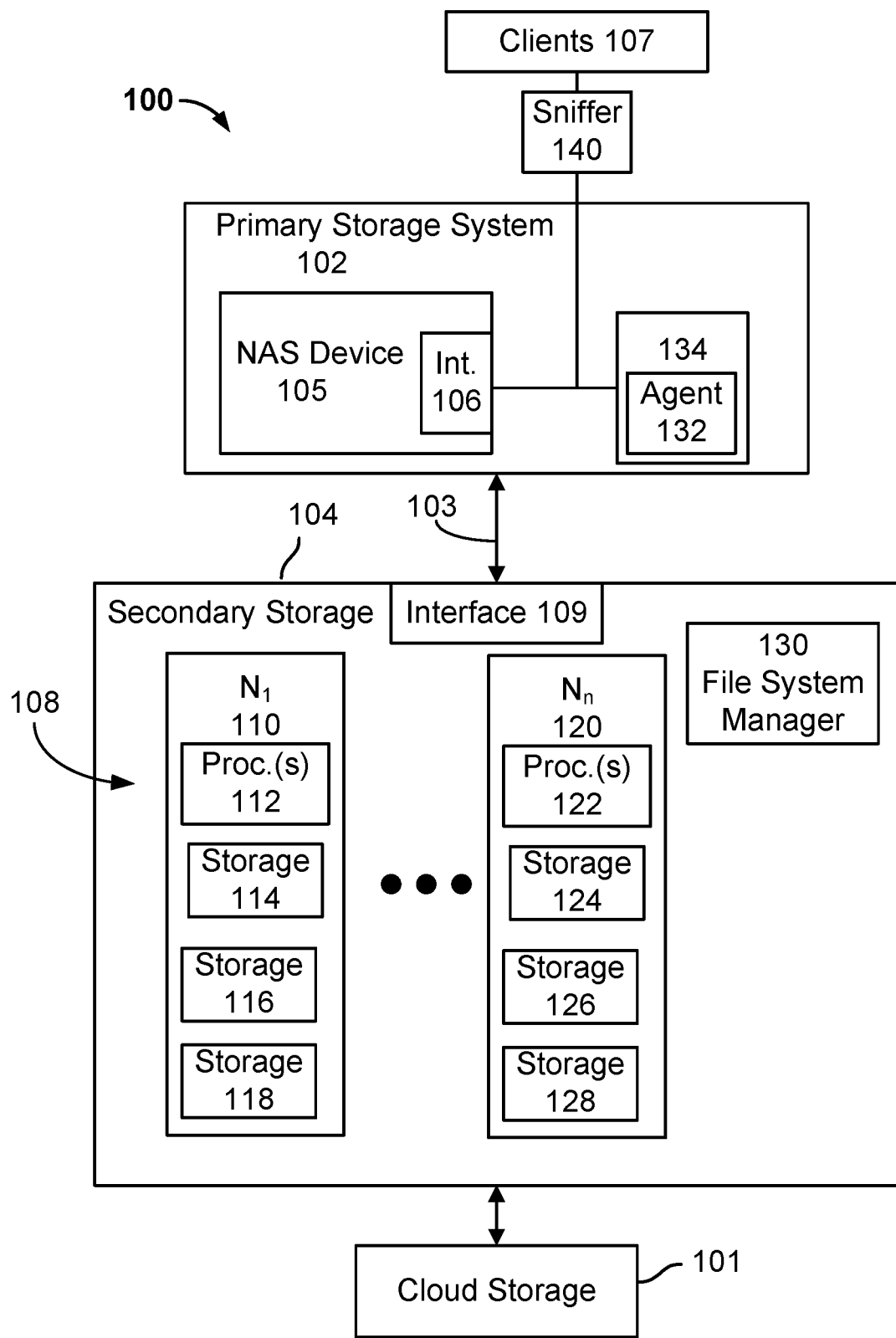
FIG. 1 is a block diagram illustrating an embodiment of a distributed storage system capable of performing incremental backup of network attached storage devices.

FIG. 1 is a block diagram of system 100 for managing a distributed storage system capable of performing incremental backups of network attached storage (NAS) devices. System 100 includes a primary storage system 102, secondary storage system 104 and cloud storage 101. Primary storage system 102 is a computing system that stores file system data. Primary storage system 102 may be comprised of one or more servers, one or more computing devices, one or more storage devices, and/or a combination thereof. Such devices are accessed by clients 107. Also present in primary storage system 102 is network attached storage (NAS) device 105. NAS device 105 is a computing appliance used to store content and serve the content to clients 107 of primary storage system 102. Typically, a NAS device includes multiple storage elements and one or more processors (not shown). Although only one NAS device 105 is shown, multiple NAS devices may be present. NAS device 105 includes network interface 106 for communicating with the remaining portions of primary storage system 102 as well as clients 107 and secondary storage system 104. Although shown as part of primary storage system 102, in another embodiment, NAS device 105 could be a separate device used in conjunction with and connected to primary storage system 102.

Also shown as part of primary storage system 102 is backup agent 132 residing on device 134. Machine 134 may be a computing device, servers, storage system or other computing components of primary storage system 102.

Primary storage system 102 may be configured to backup file system data to secondary storage system 104 according to one or more backup policies. Backup agent 132 (e.g. Cohesity agent) orchestrates a backup of primary system 102. In some embodiments, backup agent 132 may initiate a backup according to one or more backup policies. In some embodiments, a backup policy indicates that file system data for primary storage system 102 are to be backed up to cloud 101 and/or secondary storage system 104 on a periodic basis (e.g., hourly, daily, weekly, monthly, etc.). In other embodiments, a backup policy indicates that file system data is to be backed up cloud 101 and/or secondary storage system 104 when a threshold size of data has changed. In other embodiments, a backup policy indicates that file system data is to be backed up cloud 101 and/or secondary storage system 104 upon a command from a user associated with primary storage system 102. In addition to or as part of controlling backup of primary storage system 102, backup agent 132 may manage back up of NAS device 105. Backup policies may dictate that NAS device 105 is backed up to cloud 101 and/or secondary storage system 104 using the same or different criteria as for primary storage system 102.

Secondary storage system 104 is a storage system configured to backup file system data received from primary storage system 102, including NAS device 105. Secondary storage system 104 may thus be coupled with the primary storage system 102 through a network 103 and network interface 109. Secondary storage system 104 may protect a large volume of applications while supporting tight business requirements (recovery time objective (RTO) and recovery point objective (RPO)). Secondary storage system 104 may unify end-to-end protection infrastructure—including target storage, provide backup, replication of data, disaster recover, and/or cloud tiering. Secondary storage system 104 may provide scale-out, globally deduplicated, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a virtual machine (VM) centralized management tool, such as vCenter, and an API for data protection. Secondary storage system may reduce the amount of time to perform RPOs and support tightly constrained RTOs by creating a clone of a backup VM and running the VM directly from secondary storage system 104. Secondary storage system 104 may integrate natively with one or more cloud servers. This eliminates the need to use tape archives by using one or more cloud servers for long-term data archival. However, nothing prevents the use of tape archives in conjunction with secondary storage system 104 if desired.

Secondary storage system 104 may be configured to implement policy based archival of older snapshots on the cluster 108 to cloud storage for long-term retention. The cloud archive allows data to be indexed for fast search and retrieval back to the cluster from the cloud. The cloud archive allows recovery of data in the event the primary cluster fails. The cloud archive may allow data encryption in-flight and at-rest in the cloud. Secondary storage system 104 may be configured to archive a copy of the file system data in a remote storage for disaster recovery. Secondary storage system 104 may be configured to move certain file system data to a remote storage location, such as cloud storage 101, to handle spikes in storage demand. Secondary storage system 104 may be configured to implement a policy-based waterfall model that moves cold data to a remote storage location, such as cloud storage 101. Upon receiving a read for data that is stored at the remote storage location, secondary storage system 104 is configured to retrieve the data and store the data at the secondary storage location.

Secondary storage system 104 is configured to store the file system data in a tree data structure and to create a snapshot of the tree data structure. The snapshot may be associated with a view at a particular moment in time. A view depicts the connections between nodes of the tree data structure and the data stored in one or more leaf nodes at the particular moment in time. The tree data structure allows a chain of snapshot trees (e.g. a Cohesity snaptree) to be linked together. Each time a snapshot is performed, a root node of the snapshot tree may be linked to one or more intermediate nodes associated with a previous snapshot tree. Secondary storage system 104 may archive the file system data to cloud storage system 101 or to the cluster 108 of secondary storage system 104. The archive may include the file system data and a serialized snapshot tree data that is a serialized version of the tree data structure at the particular moment in time. In some embodiments, the archive includes a full snapshot archive of the file system data. In other embodiments, the archive includes an incremental snapshot archive of the file system data. In some embodiments, a backup policy may indicate that one or more previous snapshots are to be deleted after a full snapshot is performed.

Secondary storage system 104 may be configured to archive any of the data stored on secondary storage system 104 (e.g., tree data, other non-tree data) according to one or more archive policies. In some embodiments, an archive policy indicates that the data is to be archived to a cloud storage system and/or to a cluster storage system on a periodic basis (e.g., hourly, daily, weekly, monthly, etc.). In other embodiments, an archive policy indicates that data is to be archived to a cloud storage system and/or to another cluster storage system when a threshold size of data has changed. In other embodiments, an archive policy indicates that data is to be archived to a cloud storage system and/or to an additional cluster storage system upon a command from a user associated with secondary storage system 104.

Secondary storage system 104 may include a file system manager 130, which is configured to maintain file system data in the form of nodes arranged in the tree data structure. File system manager 130 may include instructions stored in memory (not explicitly shown in FIG. 1) and run by a processor (not shown in FIG. 1). In some embodiments, leaf nodes in the file system tree include key-value pairs that associate data keys with values in the form of particular items of file system data. A user requests a particular item of data by providing a data key to file system manager 130, which traverses a file system tree to find the item of data associated with that data key. File system manager 130 may be configured to perform a snapshot of a snapshot tree. File system manager 130 may be configured to perform one or more modifications to a snapshot tree.

Storage cluster 108 of secondary storage system 100 includes a plurality of storage nodes $N_1$ through $N_n$. For simplicity, only nodes $N_1$ 110 and $N_n$ 120 are labeled and shown. Each storage node 110 through 120 of secondary storage system 104 may be comprised of one or more processors 112 and 122 and accompanying storage elements 114, 116 and 118 and 124, 126 and 128, respectively. Storage elements 114, 116, 118, 124, 126 and/or 128 may be solid state drives, one or more hard disk drives, or a combination thereof. Secondary storage system 104 may also include one or more processors coupled to the storage drives and configured to archive data stored in the storage drives to cloud storage system 101, an additional cluster (not shown), and/or one or more other storage mediums (e.g. tape, removable storage).

Cloud storage system 101 may be a public cloud storage provider (e.g., Amazon Web Services, Microsoft Azure Blob Storage, Google Cloud Storage). Cloud storage system 101 is configured to receive and store an archive from secondary storage system 104. Cloud storage system 101 may store a full snapshot of file system data and associated serialized snapshot tree data. Cloud storage system 101 may store an incremental snapshot of file system data and associated serialized snapshot tree data. Cloud storage system 101 may provide to secondary storage system 104 file system data and a serialized snapshot tree data associated with a particular time.

Figure 2A:
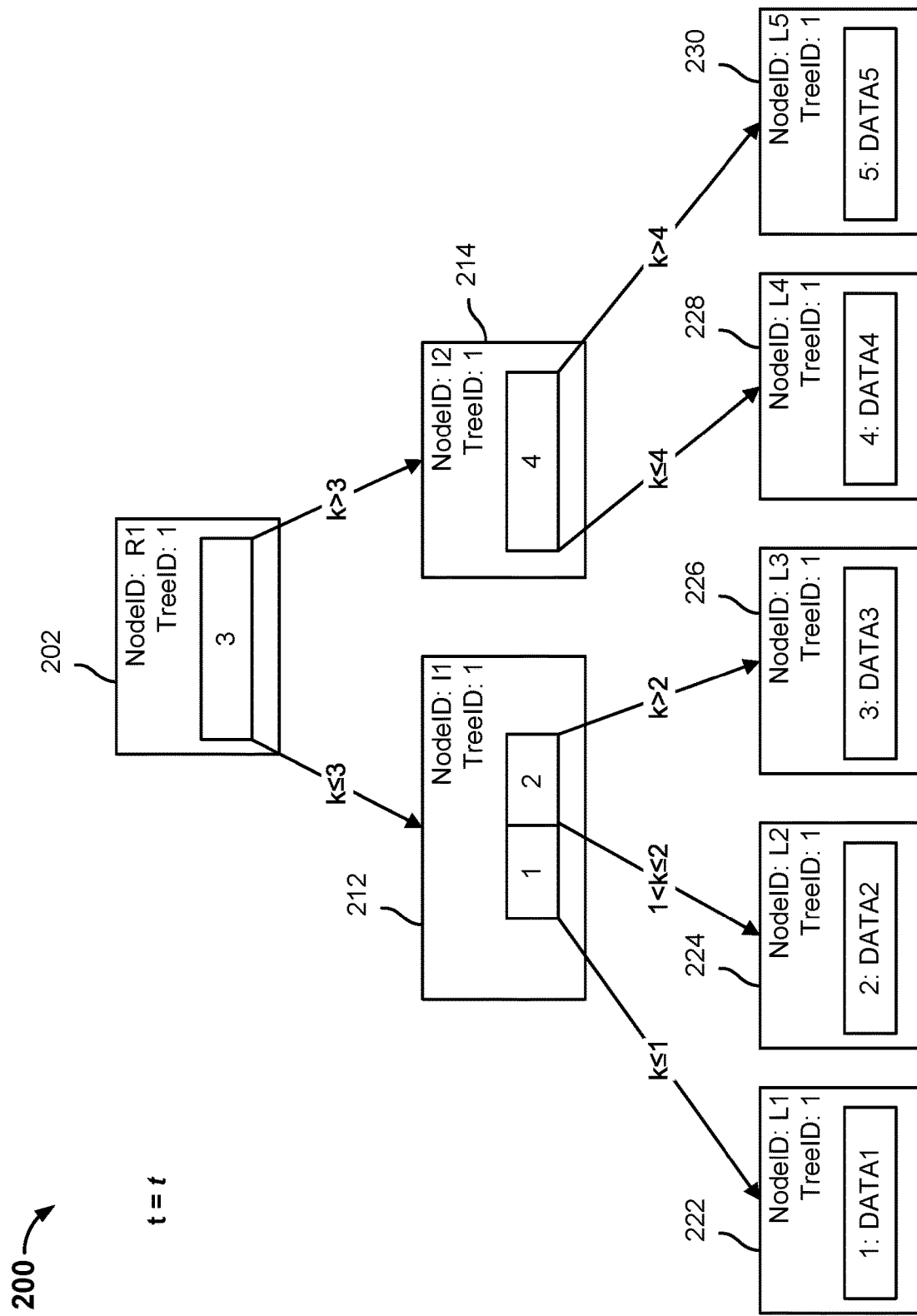
FIG. 2A is a block diagram illustrating an embodiment of a snapshot tree storing file system data.

For example FIGS. 2A-2E and 3A-3D describe snapshot trees. FIG. 2A is a block diagram illustrating an embodiment of a tree data structure storing file system data. In the example shown, tree data structure 200 may be created by a storage system, such as secondary storage system 104. In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t. Tree data structure 200 may correspond to a version of a snapshot tree. Root node 202 is associated with the snapshot of the file system data at the particular point in time t. In some embodiments, the file system data is metadata for a distributed file system and may include information, such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree. A leaf node may store key-value pairs of file system data. A data key k is a lookup value by which a particular leaf node may be accessed. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key.

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function applied to a non-numerical data key, resulting in a corresponding hash. The hash can be used to select which branch of a node is associated with the non-numerical data key.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3."

Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

Figure 2B:
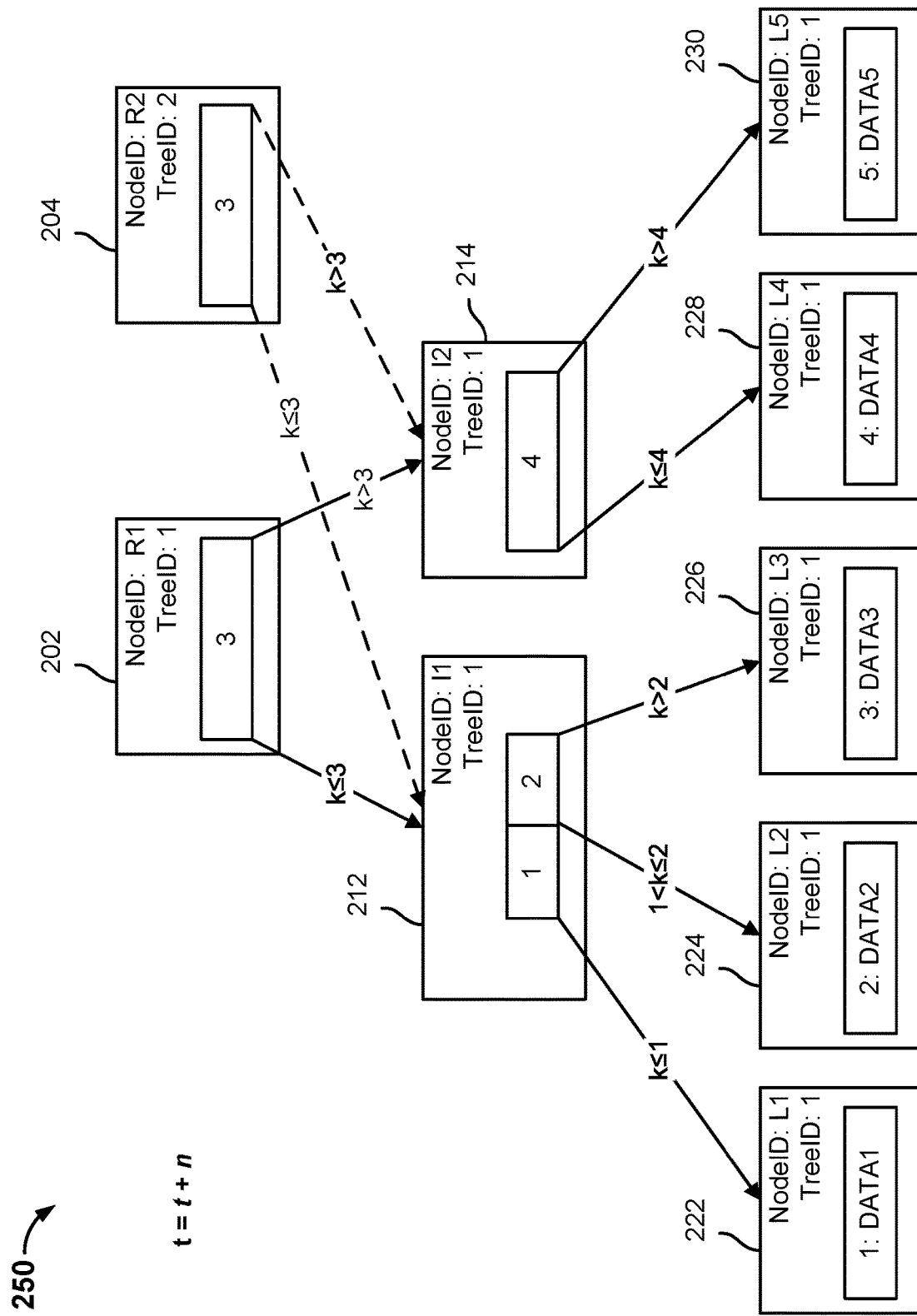
FIG. 2B is a block diagram illustrating an embodiment of cloning a snapshot tree.

FIG. 2B is a block diagram illustrating an embodiment of cloning a snapshot tree of a tree data structure. In some embodiments, tree data structure 250 may be created by a storage system, such as secondary storage system 104. In the example shown, snapshot tree 250 includes a snapshot tree that is comprised of root node 204, intermediate nodes 212, 214, and leaf nodes 222, 224, 226, 228, and 230. Tree data structure 250 may be a snapshot of file system data at a particular point in time t+n. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy also includes a different NodeID and a different TreeID than the original. The TreeID is the identifier associated with a view. Root node 204 is associated with the snapshot of the file system data at the particular point in time t+n. Root node 202 is associated with the snapshot of the file system data at the particular point in time t. The snapshot tree at time t+n may correspond to a version of a snapshot tree. In some embodiments, the snapshot tree at time t+n is a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, the snapshot tree at time t+n is a snapshot view of the file system metadata. A snapshot view may not accept any changes to the data.

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot is deleted after a snapshot is performed, i.e., root node 202 is deleted after root node 204 is created.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
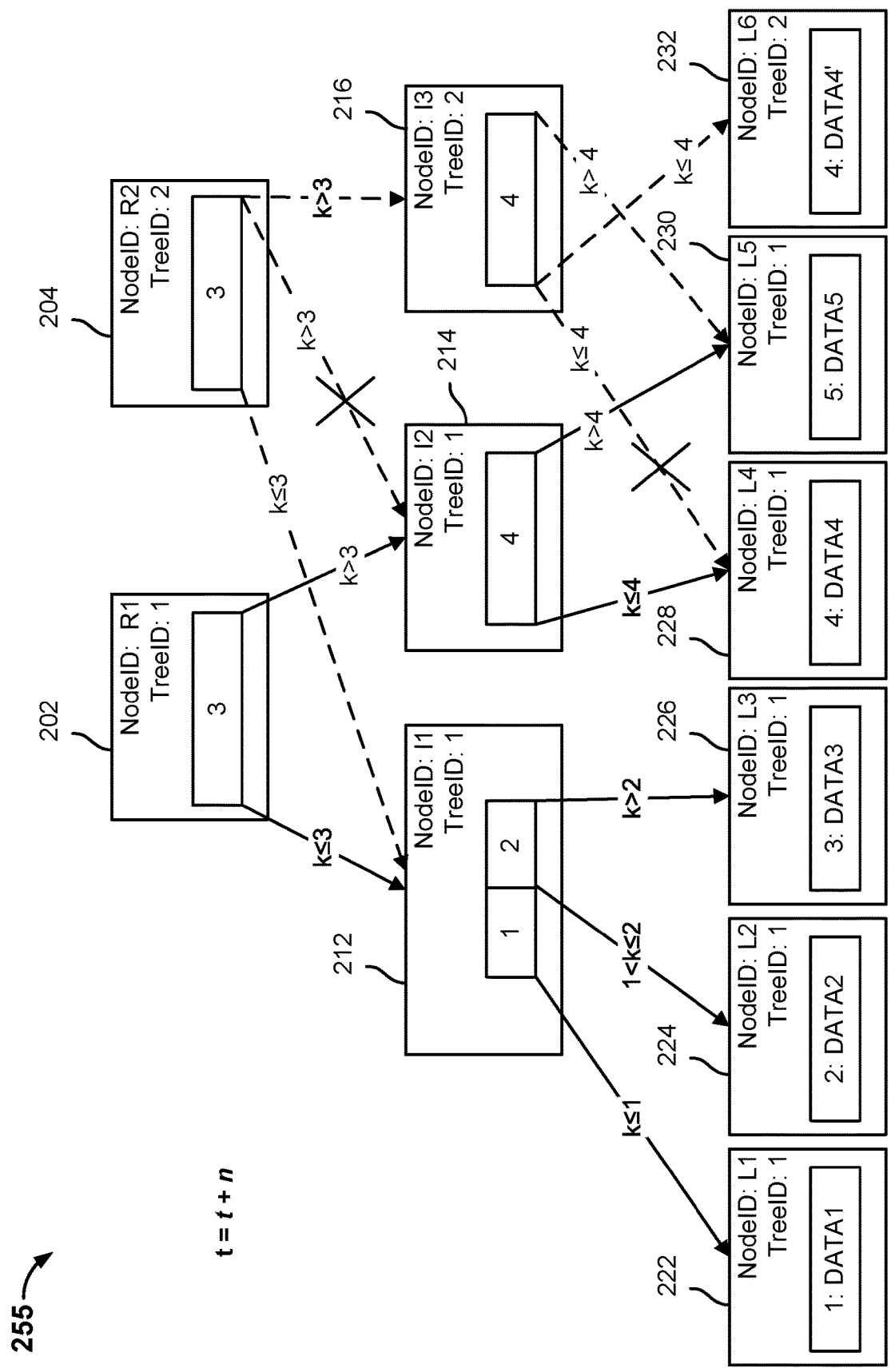
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DAT A4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
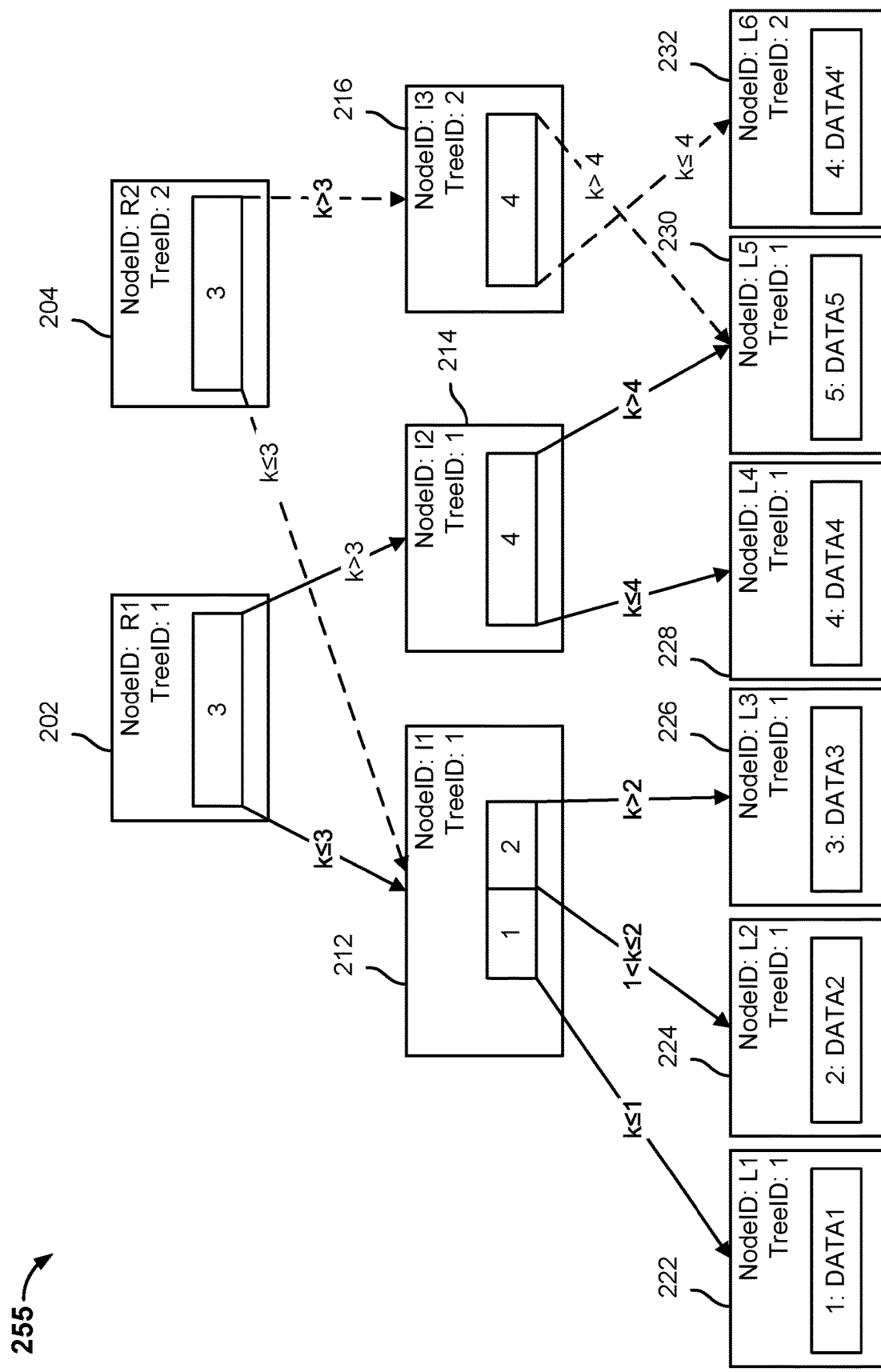
FIG. 2D is a block diagram illustrating an embodiment of a modified snapshot tree.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

Figure 2E:
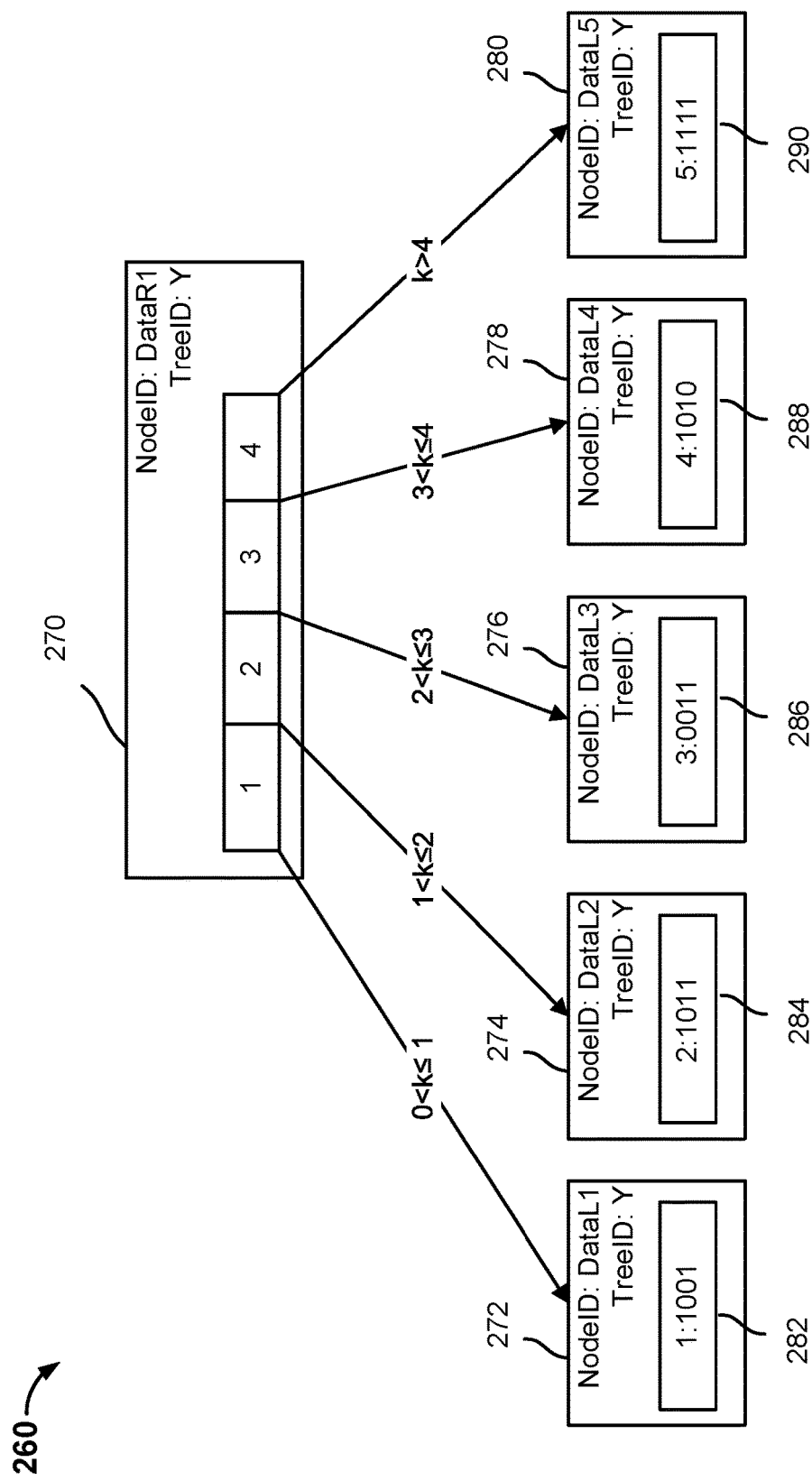
FIG. 2E is a block diagram illustrating an embodiment of leaf node data.

FIG. 2E is a block diagram illustrating an embodiment of leaf node data. In the example shown, leaf node 260 may be leaf node 222, 224, 226, 228, 230. A tree data structure may be used to store data related to a value associated with a leaf node. In some embodiments, a leaf node, such as leaf node 222, 224, 226, 228, 230, may include a pointer to a tree data structure, such as the tree data structure depicted in FIG. 2E.

In the example shown, leaf node 260 includes a data root node 270 and data leaf nodes 272, 274, 276, 278, and 280. A leaf node may include one or more intermediate nodes, similar to the tree data structure depicted in FIG. 2A. Data root node 270 includes a NodeID and a TreeID. Data root node 270 also includes a set of node keys. Data root node 270 includes a first node key of "1," a second node key of "2," a third node key of "3," and a fourth node key of "4." The data key k for data leaf node 272 is a value that is less than or equal to the first node key. Data leaf node 272 includes a data block 282 that stores bits of ones and zeros. Although data block 282 is depicted as storing the bit pattern "1001," a data block may store any bit pattern. Data leaf node 272 may include a pointer to a physical location that stores the data.

The data key k for data leaf node 274 is a value that is greater than the first node key and less than or equal to the second node key. Data leaf node 274 includes a data block 284 that stores bits of ones and zeros. Although data block 284 is depicted as storing the bit pattern "1011," a data block may store any bit pattern. Data leaf node 274 may include a pointer to a physical location that stores the data.

The data key k for data leaf node 276 is a value that is greater than the second node key and less than or equal to the third node key. Data leaf node 276 includes a data block 286 that stores bits of ones and zeros. Although data block 286 is depicted as storing the bit pattern "0011," a data block may store any bit pattern. Data leaf node 276 may include a pointer to a physical location that stores the data.

The data key k for data leaf node 278 is a value that is greater than the third node key and less than or equal to the fourth node key. Data leaf node 278 includes a data block 288 that stores bits of ones and zeros. Although data block 288 is depicted as storing the bit pattern "1010," a data block may store any bit pattern. Data leaf node 278 may include a pointer to a physical location that stores the data.

The data key k for data leaf node 280 is a value that is greater than the fourth node key. Data leaf node 280 includes a data block 290 that stores bits of ones and zeros. Although data block 290 is depicted as storing the bit pattern "1111," a data block may store any bit pattern. Data leaf node 280 may include a pointer to a physical location that stores the data.

Figure 3A:
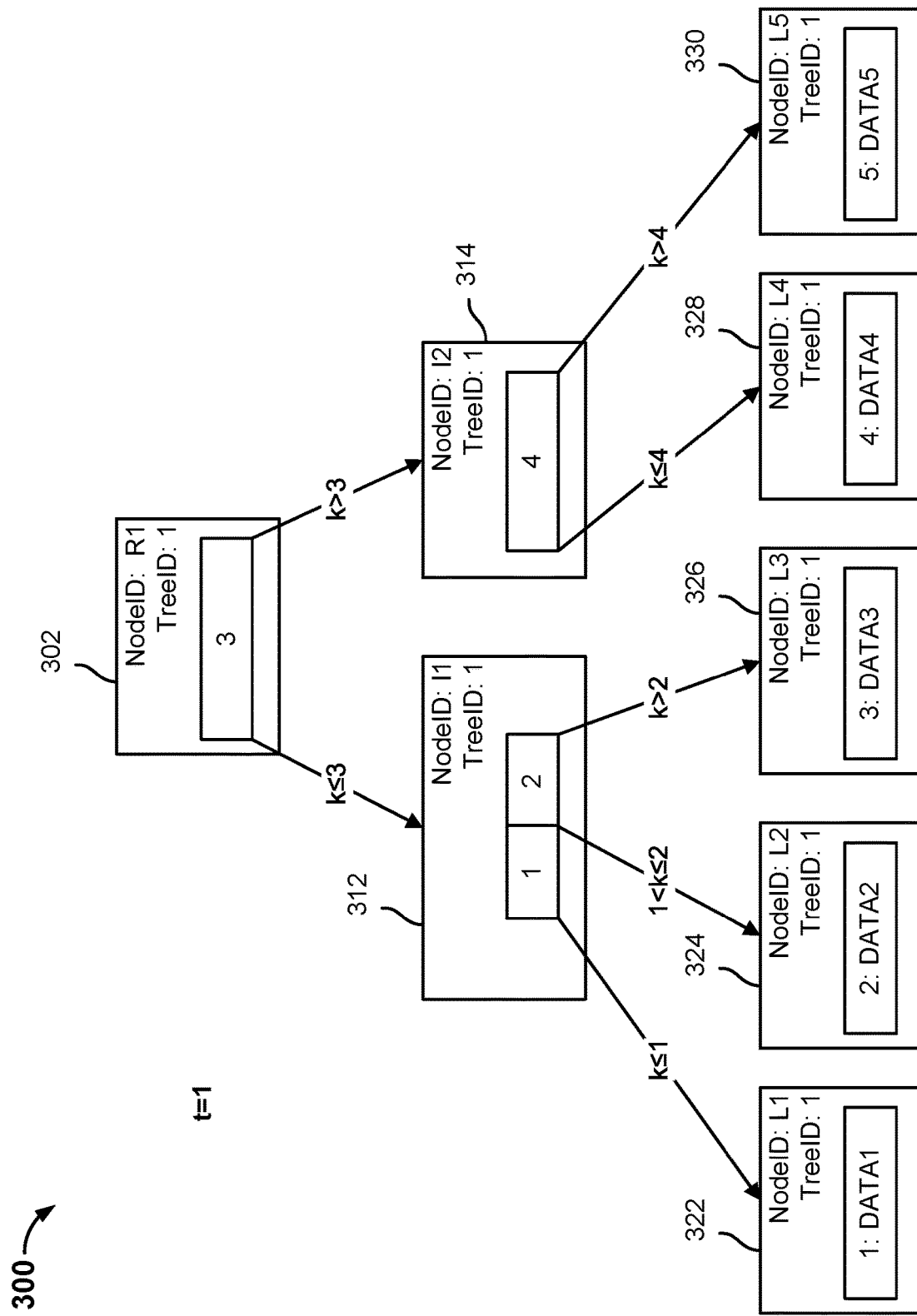
FIG. 3A is a block diagram illustrating an embodiment of a snapshot tree at a particular moment in time.

FIG. 3A is a block diagram illustrating an embodiment of a tree data structure at a particular moment in time. In the example shown, tree data structure 300 is a snapshot tree at time t=1. At t=1, tree data structure 300 includes a root node 302, intermediate nodes 312, 314, and leaf nodes 322, 324, 326, 328, 330. At t=1, tree data structure 300 is similar to the tree data structure 200 shown in FIG. 2A. Tree data structure 300 may correspond to a version of a snapshot tree.

A full snapshot or an incremental snapshot of the snapshot tree at time t=1 may be performed and stored on the storage system. The full snapshot may provide a complete view of the tree data structure at a particular point in time, that is, the full snapshot stores all of the nodes associated with a snapshot at the particular moment in time. For example, a full snapshot at time t=1 would include root node 302, intermediate nodes 312, 314, leaf nodes 322, 324, 326, 328, and 330. An incremental snapshot may provide a partial view of the tree data structure at a particular time. However, in this instance, an incremental snapshot at time t=1 would also include root node 302, intermediate nodes 312, 314, leaf nodes 322, 324, 326, 328, and 330 because those nodes have not been previously stored.

Figure 3B:
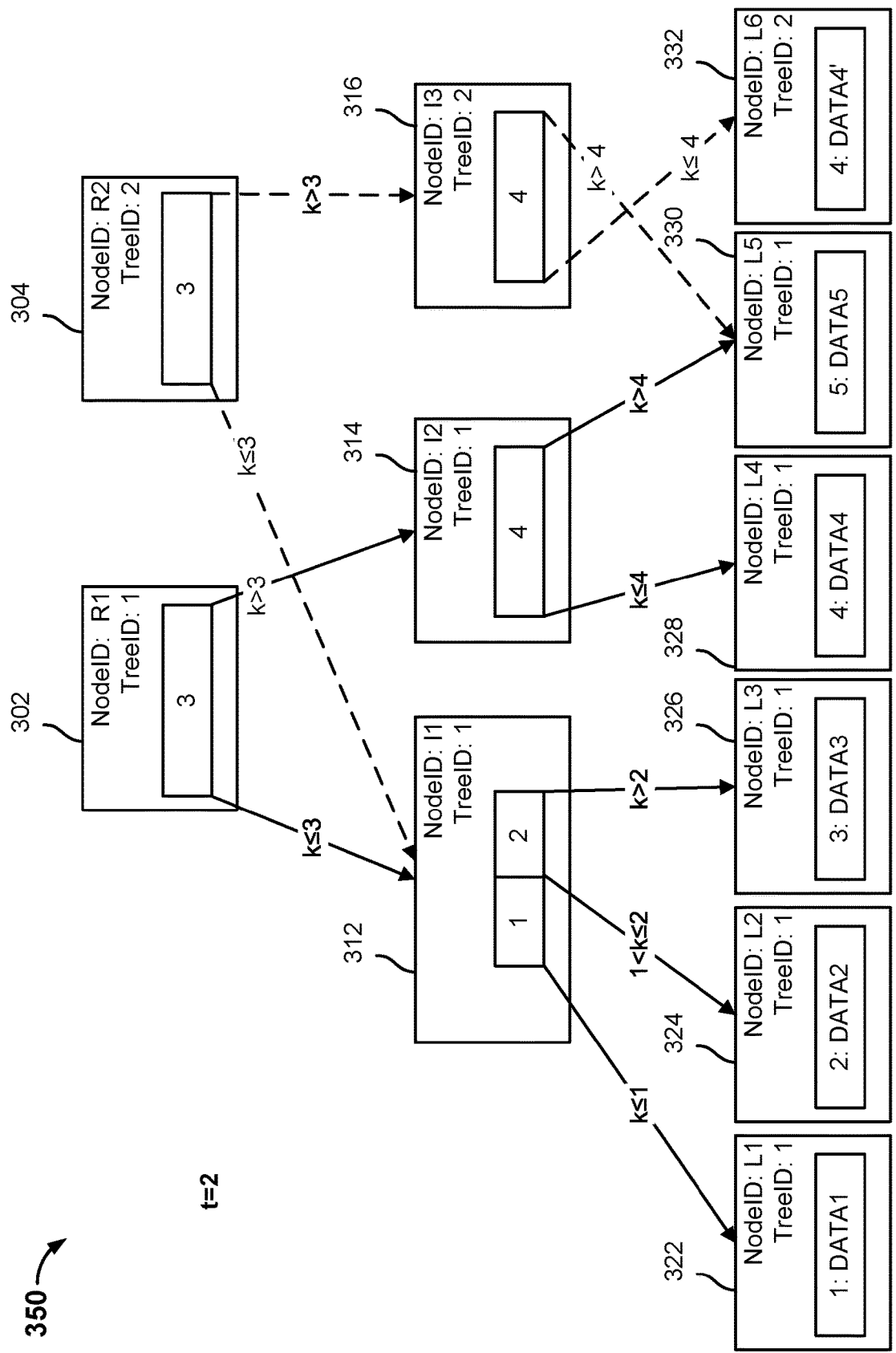
FIG. 3B is a block diagram illustrating an embodiment of a snapshot tree at a particular moment in time.

FIG. 3B is a block diagram illustrating an embodiment of a tree data structure at a particular moment in time. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=2 is linked to the snapshot tree at time t=1. At t=2, the snapshot tree includes root node 304, intermediate nodes 312, 316, and leaf nodes 322, 324, 326, 330, 332. Root node 302 is associated with a snapshot at time t=1 and root node 304 is associated with a snapshot at time t=2. At t=2, the tree data structure 350 is similar to the tree data structure 255 shown in FIG. 2D. The snapshot tree at time t=2 is a modified version of snapshot tree at time t=1 (i.e., the value of "DATA4" has been modified to be "DATA4'"). The snapshot at t=2 may correspond to a version of a snapshot tree.

A full snapshot or an incremental snapshot of the snapshot tree at t=2 may be performed and stored on the storage system. The full snapshot may provide a complete view of the tree data structure at a particular point in time, that is, the full snapshot stores all of the nodes associated with a snapshot tree at the particular moment in time. For example, a full snapshot at time t=2 would include root node 304, intermediate nodes 312, 316, leaf nodes 322, 324, 326, 330, 332, but would not include root node 302, intermediate node 314, and leaf node 328 because those nodes are not associated with the snapshot at time t=2, i.e., a node of a snapshot at time t=2 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=2 would include root node 304, intermediate node 316, and leaf node 332, but in contrast to the full snapshot at t=1, would not include intermediate node 312 and leaf nodes 322, 324, 326, and 330 because those nodes were previously stored at time t=1.

Figure 3C:
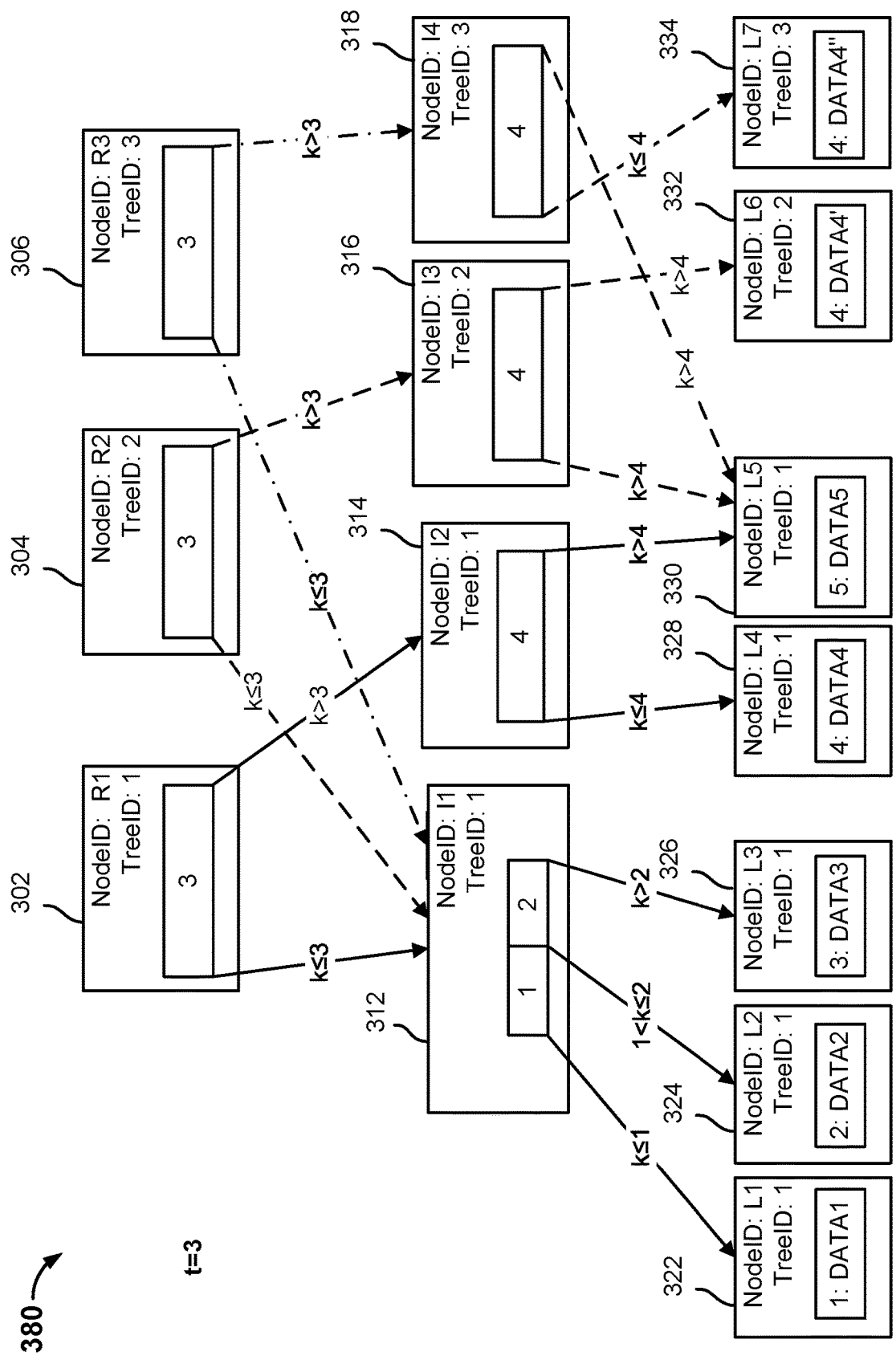
FIG. 3C is a block diagram illustrating an embodiment of a snapshot tree at a particular moment in time.

FIG. 3C is a block diagram illustrating an embodiment of a tree data structure at a particular moment in time. In the example shown, tree data structure 380 includes a snapshot tree at time t=3. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at t=3 is linked to the snapshot trees at t=1, 2. At t=3, the snapshot tree includes root nodes 306, intermediate nodes 312, 318, and leaf nodes 322, 324, 326, 330, 334. Root node 302 is associated with a snapshot at time t=1, root node 304 is associated with a snapshot at time t=2, and root node 306 is associated with a snapshot at time t=3. Snapshot tree 380 is a modified version of the snapshot at t=2 (i.e., the value of "DATA4"' has been modified to be "DATA4'''). The snapshot tree at t=3 may correspond to a version of a snapshot tree.

A full snapshot or an incremental snapshot of the snapshot tree at t=3 may be performed and stored on the storage system. The full snapshot may provide a complete view of the tree data structure at a particular point in time, that is, the full snapshot stores all of the nodes associated with a snapshot at the particular moment in time. For example, a full snapshot at time t=3 would include root node 306, intermediate nodes 312, 318, leaf nodes 322, 324, 326, 330, 334, but would not include root nodes 302, 304, intermediate nodes 314, 316 and leaf nodes 328, 332 because those nodes are not associated with the snapshot at time t=3, i.e., a node of a snapshot at time t=3 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=3 would include root node 306, intermediate node 318, and leaf node 334, but in contrast to the full snapshot at t=3, would not include intermediate node 312 and leaf nodes 322, 324, 326, and 330 because those nodes were previously stored at time t=1.

Figure 3D:
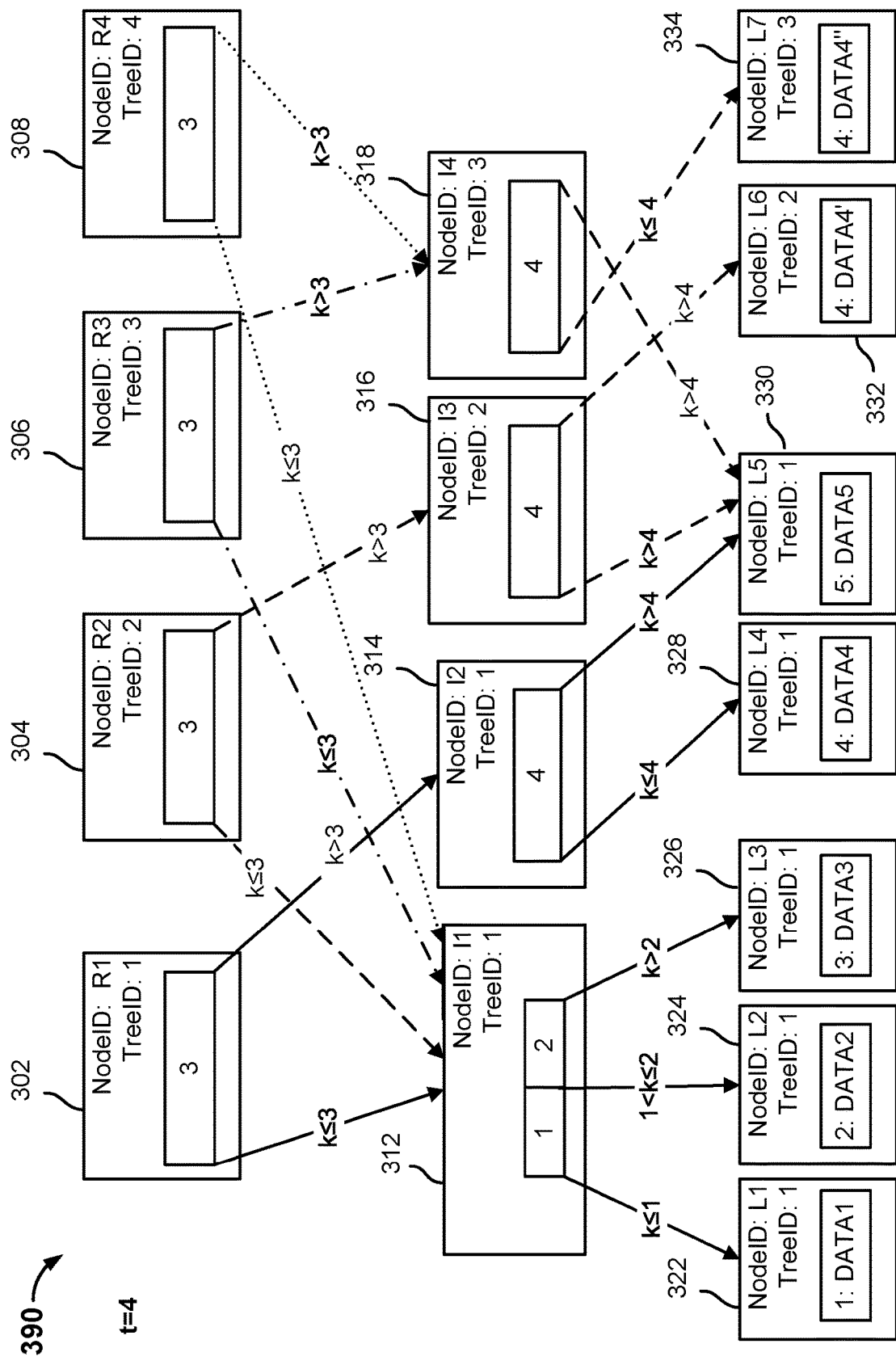
FIG. 3D is a block diagram illustrating an embodiment of a snapshot tree at a particular moment in time.

FIG. 3D is a block diagram illustrating an embodiment of a tree data structure at a particular moment in time. In the example shown, tree data structure 390 includes a snapshot tree at time t=4. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=4 is linked to the snapshot trees at times t=1, 2, 3. At t=4, the snapshot tree includes root node 308, intermediate nodes 312, 318, and leaf nodes 322, 324, 326, 330, 334. Root node 302 is associated with a snapshot at time t=1, root node 304 is associated with a snapshot at time t=2, root node 306 is associated with a snapshot at time t=3, and root node 308 is associated with a snapshot at time t=4. The snapshot tree at time t=4 may correspond to a version of a snapshot tree.

A full snapshot or an incremental snapshot of the snapshot tree at time t=4 may be performed and stored on the storage system. The full snapshot may provide a complete view of the tree data structure at a particular point in time, that is, the full snapshot stores all of the nodes associated with a snapshot at the particular moment in time. For example, a full snapshot at time t=4 would include root node 308, intermediate nodes 312, 318, leaf nodes 322, 324, 326, 330, 334, but would not include root nodes 302, 304, 306 intermediate nodes 314, 316 and leaf nodes 328, 332 because those nodes are not associated with the snapshot at time t=4, i.e., a node of a snapshot at time t=4 does not include a pointer to any of those nodes. An incremental snapshot may provide a partial view of the tree data structure at a particular time. The incremental snapshot may store each of the nodes associated with the snapshot tree at a particular moment in time that has not been previously stored. For example, an incremental snapshot at time t=4 would include root node 308, but in contrast to the full snapshot at t=4, would not include intermediate nodes 312, 318 and leaf nodes 322, 324, 326, 330, 334 because those nodes were previously stored at time t=1 or t=3.

As seen in FIGS. 3B-3D, each snapshot tree builds off of a previous snapshot tree, that is, a chain of snapshot trees exists. Each snapshot tree is associated with a snapshot of the file system data. As more and more snapshots are created and linked, this may require a lot of storage to store the snapshots. To reduce the amount of storage needed to store the snapshots, a policy may indicate that after a full snapshot is performed at a particular point in time, one or more previous snapshots may be deleted from the storage system. In some embodiments, the one or more previous snapshots are deleted after a condition of a retention time policy has passed.

Referring back to FIG. 1, secondary storage system 104 may efficiently and reliably back up data for primary storage system 102 in a distributed manner. In addition, storage system 100 provides more efficient incremental backup of NAS device 105 than in conventional storage systems. Secondary storage 104 can perform a full backup of NAS device 105. This full backup may be implemented as part of a backup of primary storage system 102 or may be a separate backup of only NAS device 105. For example, secondary storage system 102 may receive a NAS snapshot of the files on NAS device 105. This NAS snapshot may be completed by NAS device 105. Secondary storage system 104 uses the NAS snapshot to perform a backup of the contents of NAS device 105. For example, secondary storage system 104 may store data corresponding to the NAS snapshot and provide a snapshot tree associated with file system data for the NAS snapshot. Secondary storage system 104 stores both the snapshot tree and copies of the content items of the NAS snapshot at physical locations in cluster 108, such as storage elements 114, 116, 118, 124, 126 and 128 in storage nodes 110 through 120. Thus, all of the files on NAS device 105 as they existed at the time of the NAS snapshot are stored by secondary storage system 104. At a later time, instead of performing another full backup, an incremental backup is performed. This incremental backup, also known as a differential backup, stores items that have been modified since the previous backup. A new snapshot tree can also be generated as part of the incremental backup. The differential backup is performed using network packets for NAS device 105.

In the embodiment shown in FIG. 1, storage system 100 includes sniffer 140 that can be used in performing an incremental backup of NAS device 105. Sniffer 140 may reside between clients 107 and NAS device 105. Sniffer 140 may be outside primary storage system 102 as shown in FIG. 1, or within primary storage system 102. In some embodiments, sniffer 140 is implemented in software, hardware, firmware or combinations thereof. In some embodiments, sniffer 140 may be a hardware device coupled between clients 107 and NAS device 105. In some embodiments, secondary storage system 104 configures sniffer 140 to operate as described herein. Sniffer 140 detects network packets and identifies tracked network packets for NAS device 105. A tracked network packet is a network packet that includes one or more change operations for content item(s) on NAS device 105. For example, sniffer 140 may monitor network interface 106 or networking components between clients 107 and primary storage 102. Sniffer 140 detects tracked network packets that are received by network interface 106 and that are used to write to, delete, or otherwise alter files on NAS device 105. To identify tracked network packets, sniffer 140 uses metadata of the network packets. For example, sniffer 140 may utilize metadata in the headers of network packets. This metadata is also used to determine which content items on NAS device 105 have been changed since the NAS snapshot. In some embodiments, sniffer 140 determines which network packets are tracked network packets by inspecting the metadata. The metadata of the tracked network packets is provided to secondary storage system 104. In some embodiments, sniffer 140 selectively provides metadata of tracked network packets to secondary storage system 104. In other embodiments, sniffer 140 provides to secondary storage system 104 metadata for all network packets for NAS device 105. Using the metadata, it can be determined which content items have been modified since the last backup. In some embodiments, sniffer 140 determines which content items have been changed using the metadata. In other embodiments, secondary storage system 104 determines which content items have been modified. Secondary storage system 104 requests the content items that have changed from NAS device 140. Secondary storage system 104 receives the changed content item and performs an incremental backup of these content items. For example, the data for changed items may be stored in cluster 108 and a new snapshot tree may be formed. The new snapshot tree may have a root node linked to one or more intermediate nodes associated with a previous snapshot tree (for the previous backup) and corresponding to the changed items. Thus, a differential backup of NAS device 105 can be performed. Although described in the context of a single sniffer 140 and a single NAS device 105, system 100 may include multiple NAS devices and/or multiple sniffers that function in an analogous manner to those described above.

Storage system 100 improves the efficiency of backups of NAS device 105. Instead of performing a full backup each time, one or more differential backups of NAS device 105 can be performed between full backups. Consequently, computing resources are conserved and efficiency of system 100 is improved. Moreover, storage system 100 may have improved performance over other systems that perform incremental backups of NAS devices. NAS devices such as NAS device 105 frequently represent files in a NAS tree structure. This NAS tree structure includes all files on the NAS device. After an initial backup, a subsequent, incremental backup can be performed. To do so, in a conventional system the NAS device provides the entire NAS tree structure to the conventional backup storage system. The conventional backup storage system then traverses the entire tree structure to determine the files on the NAS device that have been altered since the previous backup. Once the entire tree structure has been traversed, the conventional backup storage system can identify all of the files that have been changed and can request these files. In contrast, storage system 100 uses metadata from network packets to determine the content items, such as files, on NAS device 105 that have been modified. In some embodiments, metadata only from network packets resulting in changes to content items since the last backup on NAS device 105 are provided to secondary storage system 104. In some such embodiments, the identities of content items that have been modified are provided to secondary storage system 104. Thus, secondary storage system 104 can be provided only with information related to content items that have been modified. The entire tree structure of NAS device 105 need not be requested or traversed to determine the files on the NAS device that have been altered since the previous backup. Secondary storage system 104 then requests these modified items and performs a backup only on these modified items. Consequently, the content items that have been changed and should be part of the differential backup can more rapidly and easily be identified. As a result, efficiency of storage system 100 is further improved. Using this technique, a lower RPO can be achieved for NAS backups. Moreover, because this mechanism uses detection of tracked network packets, the method may not require customization for different NAS device vendors.

Figure 4:
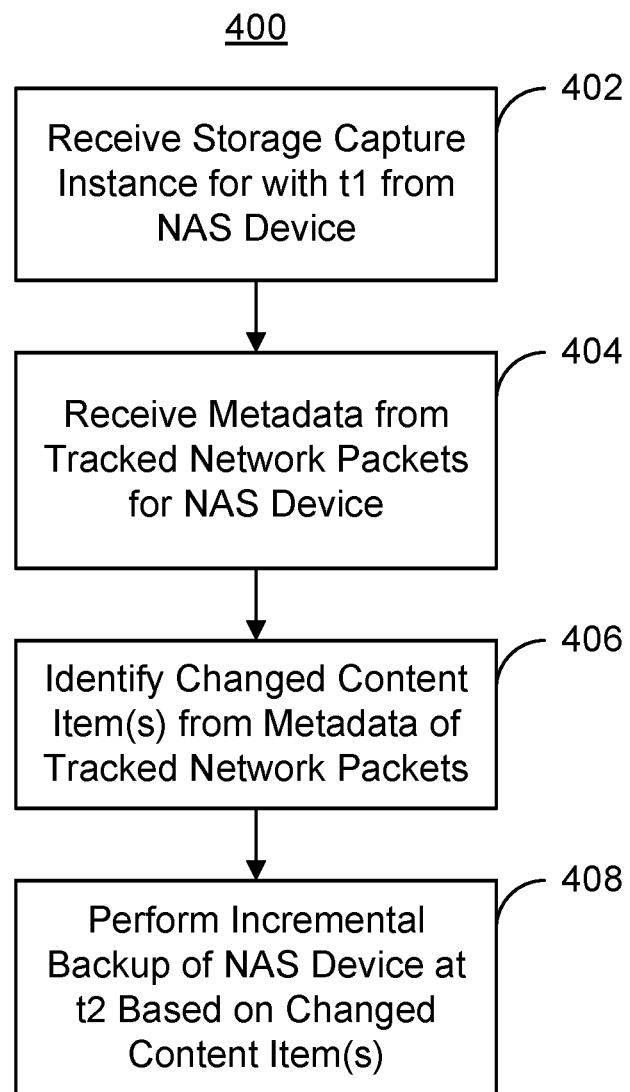
FIG. 4 is a flow chart depicting an embodiment of a method performing differential backup of network attached storage devices.

FIG. 4 is a flow chart depicting an embodiment of method 400 for performing restores differential backup using network packets. Method 400 is described in the context of system 100. However, nothing prevents method 400 from use with other systems. Portions of method 400 may be performed in a different order than shown and may include sub-processes. Additional and/or other processes not inconsistent with the method and system described herein may also be performed. In some embodiments, method 400 is performed using processor(s) executing instruction(s) stored in memory or another non-transitory computer-readable medium.

A storage capture instance is received at secondary storage 104 from NAS device 105, AT 402. This storage capture instance is associated with a particular time. For example, the storage capture instance may be a snapshot of the contents of NAS device 105 captured at a particular time. Secondary storage system 104 stores the storage capture instance in a distributed manner and in accordance with the policies of secondary storage system 104. For example, secondary storage system 104 may provide a snapshot tree associated with file system data for the storage capture instance and store the contents of the storage capture instance in cluster 108.

Metadata of tracked network packets associated with NAS device 105 are received, at 404. As discussed above, a tracked network packet is a network packet that is used to change content item on NAS device 105. For example, sniffer 140 tracks all network packets for which NAS device 105 is the recipient. Sniffer 140 does so by monitoring network interface 106 of NAS device 105 or connection between clients 107 and primary storage 102 to discover network packets.

Figure 5:
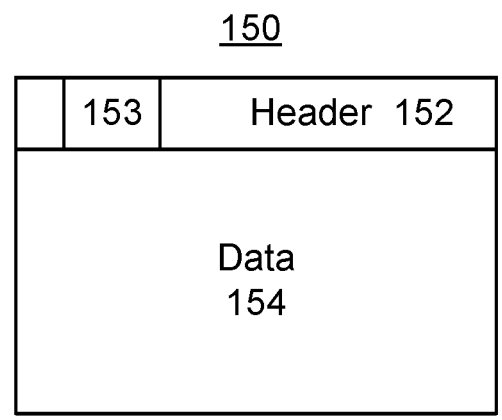
FIG. 5 is a block diagram depicting a network packet.

FIG. 5 depicts an embodiment of a network packet 150. Network packet 150 includes header 152 and data 154. Header 152 includes metadata for network packet 150. Part of this metadata, metadata 153, identifies the operation associated with network packet 150 and the content item on which the operation is to be performed. Consequently, using metadata 153, network packets that are utilized to change content items on NAS device 105 can be distinguished from network packets that do not change content items on NAS device 105. Thus, metadata 153 can be used to identify tracked network packets. Metadata 153 or information derived from metadata 153 is received by secondary storage system 104 at 404. In some embodiments, 404 includes receipt of all of the headers 154 from tracked network packets destined for NAS device 105. In other embodiments, only metadata 153 from each tracked network packet or a list of changed content items derived from metadata 153 is received by secondary storage system 104. Although all tracked network packets could be provided to secondary storage system in their entirety, in general, only headers 154, or some portion thereof, are received by secondary storage system 103. Use of headers 154, or some portion thereof, improves efficiency of storage system 100.

The content item(s) of the NAS device 105 that have changed since the storage capture instance was captured are identified, at 406. This is accomplished by analyzing the metadata 153 of the tracked network packets 150 received by secondary storage system 104. In some embodiments, 406 is performed by secondary storage system 104. In other embodiments, 406 may be performed by sniffer 140. In such embodiments, 406 precedes 404.

An incremental backup of NAS device at a second time after the capture of the storage capture instance of 402 is performed, at 408. The incremental backup is based at least in part on the changed content items identified using metadata 153. Thus, the content items that have been modified since the backup performed at 402 are replicated at 408. For example, secondary storage system 104 may provide a snapshot tree associated with file system data and store the modified content items at physical locations such as storage 114, 116, 118, 124, 126 and 128 in storage nodes 110 through 120.

Method 400 improves the efficiency of backup of NAS device 105. Instead of always performing a full backup or traversing all of a tree structure for the entire contents of NAS device 105 to determine changed content items for an incremental backup, metadata from network packets is used to determine the content items that have been modified. Thus, secondary storage system 104 can rapidly and easily determine content items on NAS device 105 that have been modified. These modified content items can be requested and differentially backed up. As a result, efficiency of backing up NAS device is further improved. Using this technique, a lower RPO can be achieved for NAS backups. Moreover, because this mechanism uses detection of tracked network packets, the method is agnostic for NAS device vendors.

Figure 6:
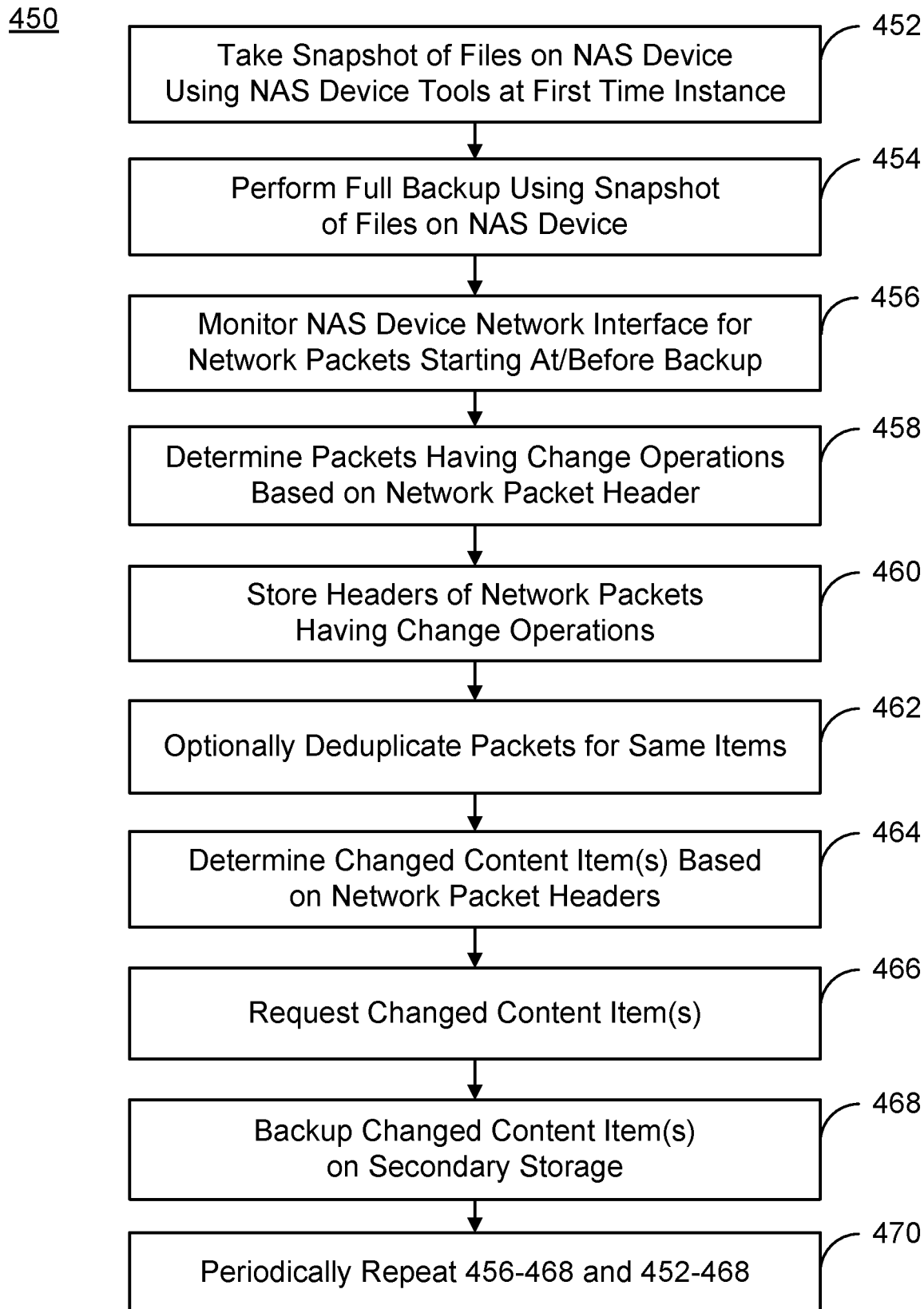
FIG. 6 is a flow chart depicting another embodiment of a method performing incremental backup of network attached storage devices.

FIG. 6 is a flow chart depicting an embodiment of method 450 for performing incremental backup using network packets. Method 450 is described in the context of system 100. However, nothing prevents method 450 from use with other systems. Portions of method 450 may be performed in a different order than shown and may include sub-processes. Additional and/or other processes not inconsistent with the method and system described herein may also be performed. In some embodiments, method 450 is performed using processor(s) executing instruction(s) stored in memory or another non-transitory computer-readable medium.

A snapshot of the files on NAS device 105 is taken using tools on the NAS device 105 at a first time, at 452. This snapshot is taken at a particular time. Consequently, a static view of NAS device 105 is obtained. This NAS snapshot corresponds to the storage capture instance described above. A full backup is performed using the NAS snapshot, at 454. 454 includes requesting the content items in the NAS snapshot from NAS device 105 and storing the content items at physical locations such as storage 114, 116, 118, 124, 126 and 128 in storage nodes 110 through 120. Secondary storage system 104 may provide a snapshot tree associated with file system data for the NAS snapshot.

Network interface 106 for NAS device 105 or connection between clients 107 and primary storage 102 is monitored at 456. Monitoring occurs starting at least just after the NAS snapshot is captured at 452. In some embodiments, monitoring may commence just before NAS snapshot is captured at 452. In other embodiments, monitoring may start at or just after the NAS snapshot is completed. This monitoring discovers network packets and ensures that changes to files in NAS device 105 occurring at or after the backup of 452 are discovered Thus, network packets for NAS device 105 can be identified.

Based on metadata 153 in the header 154 of network packets, those network packets having change operations for the file(s) residing on NAS device 105 can be determined, at 458. Stated differently, tracked network packets are identified at 458. As discussed above, metadata 153 indicates the content item, such as a file, being altered and the operation. In some NAS communication protocols, the location of the identity of the item being modified (e.g. the file name) within header 152 is indicative of the operation. For example, metadata 153 may occur at a different location in header 152 for a write operation then for a rename operation. Consequently, in some embodiments, based on the location of the identity of the item being changed in header 154, the type of operation performed (e.g. a write versus an erase) can be determined. Thus, tracked network packets are identified at 458 using metadata 153.

The metadata data of tracked network packets associated with NAS device 105 are stored, at 460. In some embodiments, headers 154 are stripped off of tracked network packets 150 and sent to secondary storage system 104. Secondary storage system 104 then stores headers 154. Alternatively, sniffer 140 may store headers 154. In other embodiments, only metadata 153 is stored at secondary storage system 104 or sniffer 140.

The headers 154 and/or metadata 153 are optionally deduplicated, at 462. In some cases, multiple network packets 150 are for the same operation. Similarly, a single file might be written to or otherwise modified multiple times. Thus, detection of multiple headers 154/network packets 150 for the same content item may indicate that the content item is changed. For determining whether a content item is part of an incremental backup, the number of times the content item is modified is generally unimportant. Instead, the fact that the content item is modified is used in determining whether to include the content item in the differential backup. Consequently, not more than one header 154/metadata 153 for a particular content item being modified is desired to be maintained. Thus, a deduplication can be carried out at 462. In some embodiments, 462 is performed periodically on headers stored at 460. In other embodiments, 462 is performed on the fly. In such embodiments, 462 may occur before 460 such that only one instance of each header 154/metadata 153 is stored per changed content item.

The content item(s) of the NAS device 105 that have changed since the storage capture instance was captured are identified, at 464. This is accomplished by analyzing the metadata 153. As indicated above, metadata 153 may include an identifier, such as a file name, for each content item changed. Thus, the content items that have been modified since the last backup may be easily determined.

At a particular time, the content items that have been identified as being changed since the last backup are requested from NAS device 105, at 466. These items are backed up in secondary storage system 104, at 468. Consequently, an incremental backup of NAS device 105 is performed. Thus, the content items that have been modified since the backup performed at 452 are replicated at 468 and stored in cluster 108. Secondary storage system 104 may also provide a snapshot tree for the incremental backup at 468.

Processes 456 through 468, which perform an incremental backup based upon the tracked network packets, are optionally repeated at 470. Thus, between full backups, multiple incremental backups of NAS device 105 may be carried out. Further processes 452 through 468 may also be repeated at a different (longer) interval. NAS device 105 can periodically undergo a full backup.

Method 450 improves the efficiency of backup of NAS device 105. Instead of always performing a full backup or traversing all of a tree structure of the entire contents of NAS device 105 to determine changed content items for an incremental backup, metadata from network packets is used to determine the content items that have been modified. Thus, secondary storage system 104 can rapidly and easily determine content items on NAS device 105 that have been modified. These modified content items can be requested and incrementally backed up. As a result, efficiency of backing up NAS device is further improved. Using this technique, a lower RPO can be achieved for NAS backups. Moreover, because this mechanism uses detection of tracked network packets, the method is agnostic for NAS device vendors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, at a secondary storage system from a packet sniffer, at least a subset of metadata associated with one or more data packets, wherein the packet sniffer analyzes the one or more data packets provided from a client device to a network attached storage device;
    identifying at least one changed item of the network attached storage device based on the metadata associated with the one or more data packets; and
    performing an incremental backup of the network attached storage device at least in part by:
        requesting, by the secondary storage system from the network attached storage device, data associated with the at least one changed item;
        receiving at the secondary storage system from the network attached storage device the requested data associated with the at least one changed item; and
        backing up the requested data associated with the at least one changed item.

2. The method of claim 1, wherein a portion of the metadata associated with the one or more data packets identifies a corresponding operation associated with the one or more data packets.

3. The method of claim 2, wherein the portion of the metadata associated with the one or more data packets identifies a corresponding content item to which the corresponding operation is to be performed.

4. The method of claim 1, wherein the metadata associated with the one or more data packets is included in a corresponding header for the one or more data packets.

5. The method of claim 4, wherein the subset of the metadata associated with the one or more data packets includes all of the corresponding headers for the one or more data packets.

6. The method of claim 4, wherein the subset of the metadata associated with the one or more data packets includes metadata associated with the one or more data packets that are associated with the at least one changed item.

7. The method of claim 1, wherein the packet sniffer is located between the client device and the network attached storage device or in a primary storage system that includes the network attached storage device.

8. The method of claim 1, wherein identifying at least one changed item of the network attached storage device based on the metadata associated with the one or more data packets includes deduplicating the metadata associated with the one or more data packets.

9. The method of claim 1, wherein the one or more data packets correspond to one or more tracked network packets.

10. The method of claim 9, wherein a tracked network packet of the one or more tracked network packets includes one or more change operations for a content item on the network attached storage device.

11. The method of claim 10, wherein the one or more change operations for the content item include a write operation and a delete operation.

12. A computer program product embodied in a non-transitory computer readable medium and comprising computer instructions for:
    receiving, at a secondary storage system from a packet sniffer, at least a subset of metadata associated with one or more data packets, wherein the packet sniffer analyzes the one or more data packets provided from a client device to a network attached storage device;
    identifying at least one changed item of the network attached storage device based on the metadata associated with the one or more data packets; and
    performing an incremental backup of the network attached storage device at least in part by:
        requesting, by the secondary storage system from the network attached storage device, data associated with the at least one changed item;
        receiving at the secondary storage system from the network attached storage device the requested data associated with the at least one changed item; and
        backing up the requested data associated with the at least one changed item.

13. The computer program product of claim 12, wherein a portion of the metadata associated with the one or more data packets identifies a corresponding operation associated with the one or more data packets.

14. The computer program product of claim 13, wherein the portion of the metadata associated with the one or more data packets identifies a corresponding content item to which the corresponding operation is to be performed.

15. The computer program product of claim 12, wherein the metadata associated with the one or more data packets is included in a corresponding header for the one or more data packets.

16. The computer program product of claim 15, wherein the subset of the metadata associated with the one or more data packets includes all of the corresponding headers for the one or more data packets.

17. The computer program product of claim 15, wherein the subset of the metadata associated with the one or more data packets includes metadata associated with the one or more data packets that are associated with the at least one changed item.

18. The computer program product of claim 12, wherein identifying at least one changed item of the network attached storage device based on the metadata associated with the one or more data packets includes analyzing the metadata associated with the one or more data packets.

19. The computer program product of claim 12, wherein identifying at least one changed item of the network attached storage device based on the metadata associated with the one or more data packets includes deduplicating the metadata associated with the one or more data packets.

20. A system, comprising:
a processor configured to:
   receive, at a secondary storage system from a packet sniffer, at least a subset of metadata associated with one or more data packets, wherein the packet sniffer analyzes the one or more data packets provided from a client device to a network attached storage device;
   identify at least one changed item of the network attached storage device based on the metadata associated with the one or more data packets; and
   perform an incremental backup of the network attached storage device, wherein to perform the incremental backup of the network attached storage device, the processor is configured to:
      request, by the secondary storage system from the network attached storage device, data associated with the at least one changed item;
      receive at the secondary storage system from the network attached storage device the requested data associated with the at least one changed item; and
      back up the requested data associated with the at least one changed item; and
a memory coupled to the processor and configured to provide the processor with instructions.

* * * * *